(12) United States Patent
Wright et al.

(10) Patent No.: US 9,481,447 B2
(45) Date of Patent: Nov. 1, 2016

(54) AIRCRAFT WING WITH SLOTTED HIGH LIFT SYSTEM

(75) Inventors: Philip Wright, Bristol (GB); Edmund Kay, Bristol (GB)

(73) Assignee: Airbus Operations Limited, Bristol (GB)

( * ) Notice: Subject to any disclaimer, the term of this patent is extended or adjusted under 35 U.S.C. 154(b) by 1518 days.

(21) Appl. No.: 12/230,553

(22) Filed: Aug. 29, 2008

(65) Prior Publication Data

US 2009/0108142 A1   Apr. 30, 2009

(30) Foreign Application Priority Data

Oct. 31, 2007 (GB) .................................. 0721328.3

(51) Int. Cl.
*B64C 9/14* (2006.01)
*B64C 9/18* (2006.01)
*B64C 9/24* (2006.01)

(52) U.S. Cl.
CPC . *B64C 9/18* (2013.01); *B64C 9/14* (2013.01); *B64C 9/24* (2013.01)

(58) Field of Classification Search
CPC ............. B64C 9/14; B64C 9/16; B64C 9/18; B64C 9/20; B64C 21/00; B64C 21/02; B64C 23/06; B64C 2009/14; B64C 2009/143
See application file for complete search history.

(56) References Cited

U.S. PATENT DOCUMENTS

| | | | | |
|---|---|---|---|---|
| 1,549,223 A * | 8/1925 | Schleusner | | 244/200 |
| 1,759,164 A * | 5/1930 | Lyons | | 244/35 R |
| 1,827,845 A * | 10/1931 | Hall | | B64C 9/146 |
| | | | | 244/204 |
| 2,117,607 A * | 5/1938 | Griswold | | B64C 9/20 |
| | | | | 244/216 |
| 2,169,416 A * | 8/1939 | Griswold | | B64C 9/16 |
| | | | | 244/216 |
| 2,772,058 A * | 11/1956 | Grant | | B64C 21/02 |
| | | | | 244/216 |
| 3,371,888 A * | 3/1968 | Alvarez-Calderon | | 244/216 |
| 3,463,418 A * | 8/1969 | Miksch | | 244/200.1 |
| 3,523,661 A * | 8/1970 | Rethorst | | 244/199.2 |
| 4,131,252 A * | 12/1978 | Dean | | B64C 9/16 |
| | | | | 244/130 |
| 4,830,315 A * | 5/1989 | Presz et al. | | 244/200 |
| 4,932,612 A * | 6/1990 | Blackwelder et al. | | 244/207 |
| 5,088,665 A * | 2/1992 | Vijgen | | B64C 23/06 |
| | | | | 244/198 |
| 5,178,348 A * | 1/1993 | Bliesner | | B64C 3/14 |
| | | | | 244/200 |

(Continued)

FOREIGN PATENT DOCUMENTS

EP   1 527 992   5/2005

OTHER PUBLICATIONS

Great Britain Search Report for GB Application No. 0721328.3, dated Feb. 16, 2008.

*Primary Examiner* — Tien Dinh
*Assistant Examiner* — Michael A Fabula
(74) *Attorney, Agent, or Firm* — Nixon & Vanderhye P.C.

(57) ABSTRACT

An aircraft wing includes a leading element; a trailing element positioned behind the leading element relative to a direction of movement of the aircraft and an actuation system for moving one of the elements between a retracted position and an extended position in which there is an air gap between a lower surface of the leading element and a surface of the trailing element. Two or more elongate stiffening ridges extend downwards from the lower surface of the leading element, and each adjacent pair of ridges is separated by a channel. The leading element is shaped to provide an improved air gap, preferably one which is parallel or convergent in all positions. Typically the volume of at least one of the ridges is less than the 50% of the volume of a channel defined by that ridge.

21 Claims, 7 Drawing Sheets

(56) References Cited

U.S. PATENT DOCUMENTS

| | | | |
|---|---|---|---|
| 5,294,080 A * | 3/1994 | Ross | 244/215 |
| 5,551,651 A * | 9/1996 | Hendrickson | B64C 9/16 244/215 |
| 5,738,298 A * | 4/1998 | Ross et al. | 244/1 N |
| 6,345,791 B1 * | 2/2002 | McClure | 244/200 |
| 2003/0226936 A1 * | 12/2003 | Mau | B64C 23/005 244/214 |
| 2007/0034746 A1 * | 2/2007 | Shmilovich et al. | 244/207 |

* cited by examiner

AIRCRAFT WING WITH SLOTTED HIGH LIFT SYSTEM

This application claims priority to Great Britain Application No. 0721328.3, filed Oct. 31, 2007, the entire contents of which are hereby incorporated by reference.

FIELD OF THE INVENTION

The present invention relates to an aircraft wing comprising: a leading element; a trailing element positioned behind the leading element relative to a direction of movement of the aircraft; an actuation system for moving one of the elements between a retracted position and an extended position in which there is an air gap between a lower surface of the leading element and a surface of the trailing element.

BACKGROUND OF THE INVENTION

Slotted high lift systems are a common feature of current high lift wing design and feature a moving element or elements isolated from the main wing element by a specific aerodynamic slot shape. The function of the moving element is to increase circulation around the main wing element by the addition of extra camber. The geometry of the slot is designed to ensure that the pressure distribution around the trailing element—in particular the leading edge pressure peak—is suppressed to prevent flow separation on that element.

Figure 1:
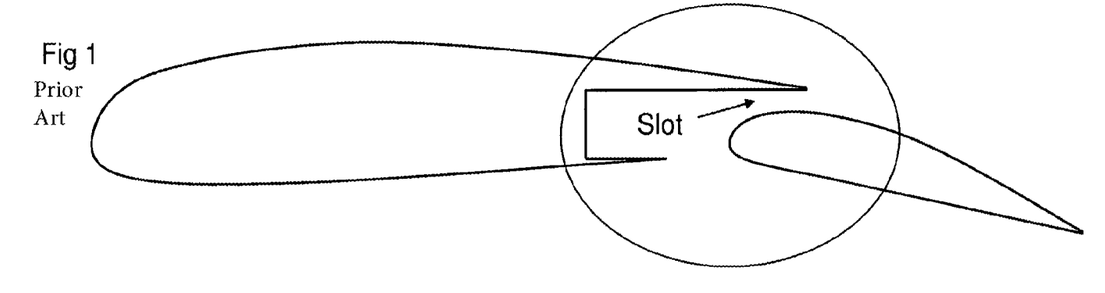
FIGS. 1-6 are side views of a conventional wing with an adjustable trailing edge flap.

The slot geometry formed between the two elements (FIG. 1) has a powerful influence on the flow quality over the trailing element. It is always important to ensure that the slot shape provides satisfactory aerodynamic performance for all usable deployment angles. Often, due to optimising the slot shape for a particular deflection, the resulting slot shape for other angles is not satisfactory and can result in high pressure gradients on the trailing element's leading edge leading to flow separation.

Figure 2:
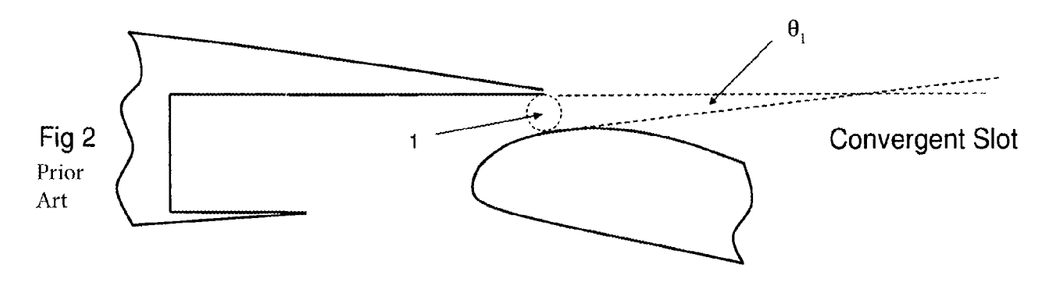
Figure 3:
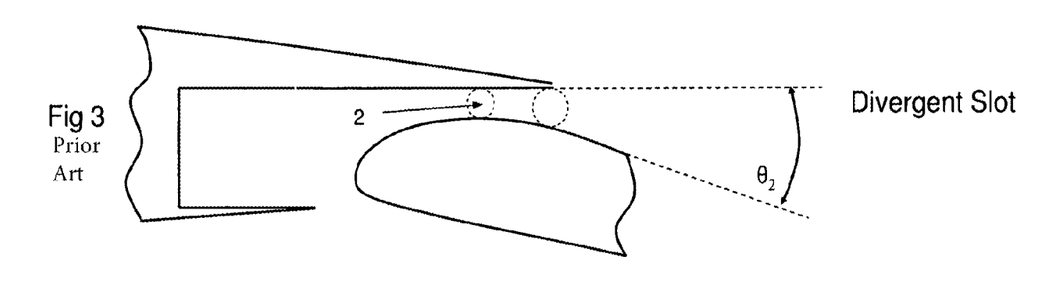

For good aerodynamic performance a slot should be convergent at the trailing edge of the leading element. (FIG. 2). This means that the tangent at the trailing edge of the leading element and the tangent at a point of minimum distance 1 on the trailing element will converge and intersect downstream of the trailing edge of the leading element. For this condition to be satisfied the minimum distance between the two elements must occur at the trailing edge of the leading element. If the minimum distance 2 occurs at a location forward of the trailing edge of the leading element then there will be no intersection of the tangent lines and a divergent slot shape will result (FIG. 3)

A divergent slot shape can result when a high overlap is used as is usually the case for low deployment angles, due to the curvature of the trailing element upper surface and its proximity to the lower surface of the leading element. The diverging exit shape is undesirable because of the flow separation that can occur at the slot exit.

Figure 4:
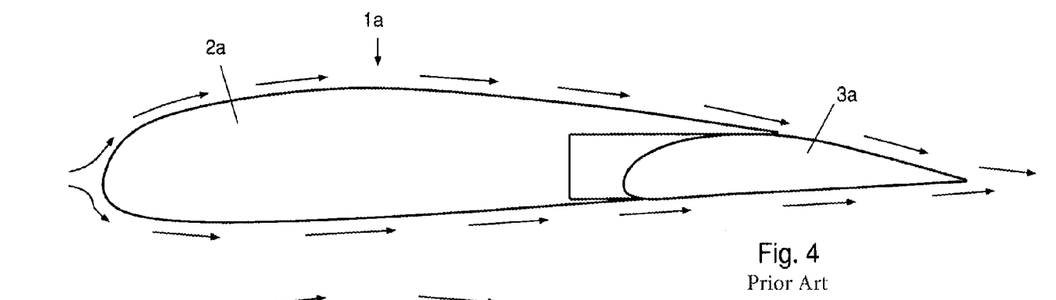
Figures 5, 6:
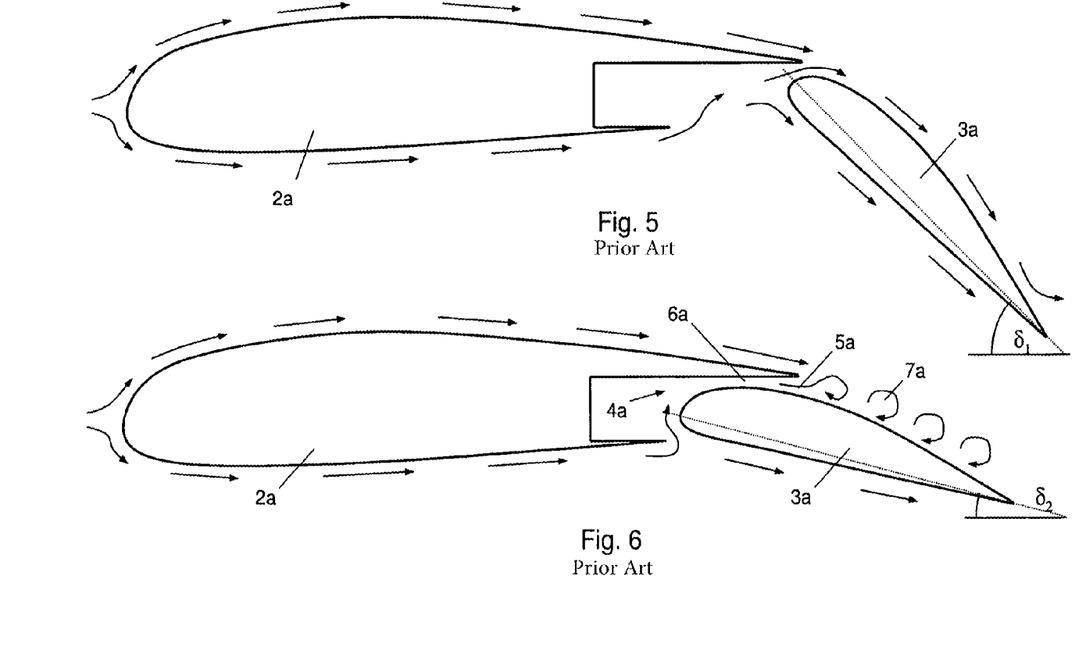

FIGS. 4-6 illustrate this problem in the case of a trailing edge flap. An aircraft wing 1 a comprises a main wing element 2a and a flap 3a. An actuation system (not shown) moves the flap 3a between a retracted position (FIG. 4) to an extended position (FIG. 5) via an intermediate position (FIG. 6). In the extended position the flap is deployed at an angle $\delta_1$ and in the intermediate position the flap is deployed at an angle $\delta_2$. In the intermediate position, the air gap 4a is highly divergent. That is, the width of the air gap at its outlet 5a is greater than the minimum width of the air gap at point 6a. This results in a high flow velocity through the gap resulting in an adverse pressure gradient further aft and flow separation 7a at the trailing edge of the flap.

Figure 12:
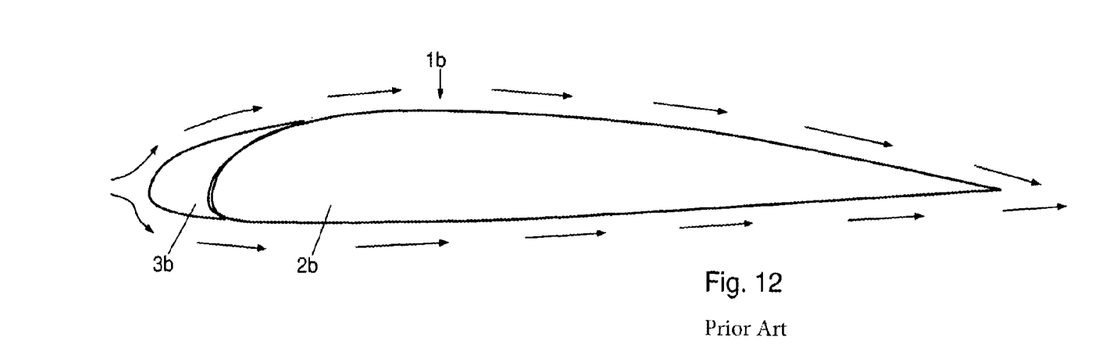
FIGS. 12-14 are side views of a conventional wing with an adjustable leading edge slat.
Figure 13:
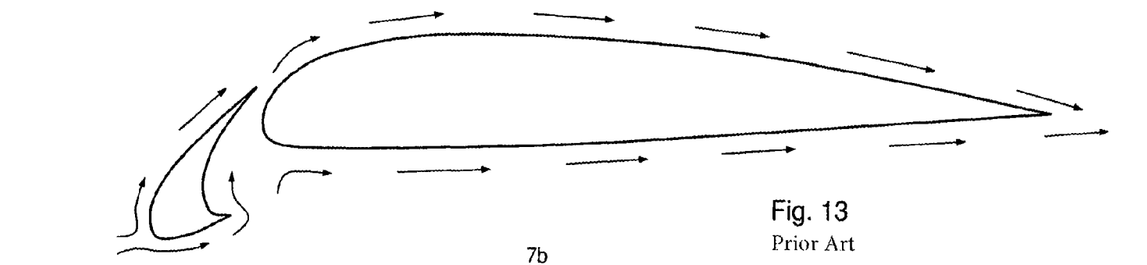
Figure 14:
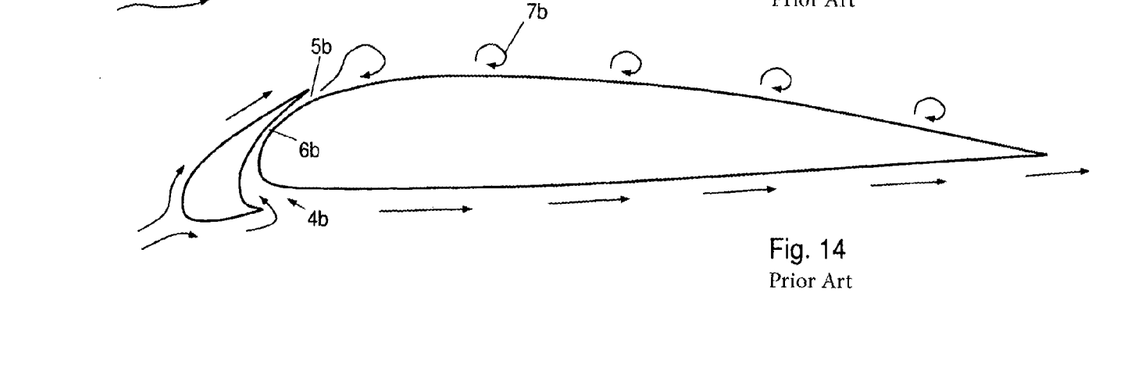

FIGS. 12-14 illustrate this problem in the case of a leading edge slat. An aircraft wing 1b comprises a main wing element 2b and a slat 3b. An actuation system (not shown) moves the slat 3b between a retracted position (FIG. 12) to an extended position (FIG. 13) via an intermediate position (FIG. 14). In the intermediate position, the air gap 4b is divergent. That is, the width of the air gap at its outlet 5b is greater than the minimum width of the air gap at point 6b. This results in a high flow velocity through the gap resulting in an adverse pressure gradient in the divergent region further aft resulting in flow separation 7b on the main wing element 2b.

One approach to solving this problem in the case of a trailing edge flap is described in US 2006/0202089 A1. The main wing element has a pivotable trailing edge which is adjusted (passively by spring tension or actively with the use of an actuator) to keep the width of the air gap constant or convergent.

A problem with the passive adjustment arrangement is that the width of the air gap cannot be precisely controlled, so the gap will change its shape under different loading. Also the flap upper surface must force the pivotable trailing edge into a flat cruise shape, and this can cause erosion of the flap upper surface. A problem with the active adjustment arrangement is that the actuator adds weight and complexity.

EP 1527992 A2 describes an arrangement for generating vortices, in which a bottom surface of the spoiler at the trailing edge of the wing has several longitudinal, elongated grooves. These grooves contain vortex generators which create vortices over the top surface of a flap behind the spoiler. These vortices prevent flow separation from the flap.

The grooves in EP 1527992 A2 have a relatively small width. This means that the air gap between the spoiler and the flap is predominantly defined by the surface of the spoiler between the grooves. As a result the grooves provide little or no aerodynamic improvement in the shape of the air gap Also, the spoiler in EP 1527992 A2 is relatively thick compared to the depths of the grooves. As a result, any improvement in the shape of the air gap provided by the grooves is minimal.

Finally, the grooves in EP 1527992 A2 terminate before the trailing edge of the spoiler. As a result the grooves have no effect on the shape of the air gap at its exit.

SUMMARY OF THE INVENTION

A first aspect of the invention provides an aircraft wing comprising: a leading element; a trailing element positioned behind the leading element relative to a direction of movement of the aircraft; an actuation system for moving one of the elements between a retracted position and an extended position in which there is an air gap between a lower surface of the leading element and a surface of the trailing element; and two or more elongate stiffening ridges extending downwards from the lower surface of the leading element, wherein each adjacent pair of ridges is separated by a channel, and the volume of at least one of the ridges is less than the 50% of the volume of a channel defined by that ridge.

In contrast with the grooves of EP 1527992 A2, the channels of the first aspect of the invention are relatively large relative to the ridges, and thus provide a significant beneficial effect in terms of improving the shape of the air gap.

A second aspect of the invention provides an aircraft wing comprising: a leading element; a trailing element positioned behind the leading element relative to a direction of movement of the aircraft; an actuation system for moving one of the elements between a retracted position and an extended position in which there is an air gap between a lower surface of the leading element and a surface of the trailing element; and two or more elongate stiffening ridges extending downwards from the lower surface of the leading element; wherein each adjacent pair of ridges is separated by a channel, and wherein the thickness of the leading element at one or more points is less than the depth of a channel at the same point.

In contrast with the grooves of EP 1527992 A2, the channels of the second aspect of the invention are relatively deep and thus provide a significant beneficial effect in terms of improving the shape of the air gap.

A third aspect of the invention provides an aircraft wing comprising: a leading element; a trailing element positioned behind the leading element relative to a direction of movement of the aircraft; an actuation system for moving one of the elements between a retracted position and an extended position in which there is an air gap between a lower surface of the leading element and a surface of the trailing element; and two or more elongate stiffening ridges extending downwards from the lower surface of the leading element; wherein each adjacent pair of ridges is separated by a channel, and wherein each channel has an open end which is positioned substantially at a trailing edge of the leading element.

In contrast with the grooves of EP 1527992 A2, the channels of the third aspect of the invention extend substantially to the trailing edge of the leading element, and thus the leading element can be shaped at its trailing edge so as to improve the shape of the air gap at its exit.

The new shape of the leading element, as defined in the various aspects of the invention, enables the shape of the air gap to be improved so that in at least one intermediate position of the actuation system it is constant or convergent, and most preferably in all positions the air gap is constant or convergent. However it will be understood that depending on the nature of the actuation system, the air gap may be divergent in some positions.

The leading element may be larger than the trailing element (for example a flap). Alternatively the leading element (for example a slat) may be smaller than the trailing element.

Both elements may be moved to open up the gap, but more typically one of the elements remains in substantially the same position during movement of the other element from its retracted position to its extended position.

Preferably at least some of the ridges extend at an angle greater than 0° to a direction of flow of air through the gap. This angle may have the same sign for all ridges, or the ridges may be arranged in a "herring-bone" formation with adjacent pairs of ridges extending at opposite angles to each other.

The trailing element is positioned behind the leading element relative to a direction of movement of the aircraft, and the term "behind" is used in the broad sense meaning that at least part of the trailing element is located behind the trailing edge of the leading element in at least the extended position. Thus the trailing element may overlap with the leading element in some or all positions of the actuation system, or may "underlap" with the leading element in some or all positions of the actuation system.

Various other advantageous features are set out below in the dependent claims.

BRIEF DESCRIPTION OF THE DRAWINGS

Embodiments of the invention will now be described with reference to the accompanying drawings, in which.

DETAILED DESCRIPTION OF EMBODIMENT(S)

An aircraft wing shown in FIGS. 7-11 comprises a main wing element 11 and a flap 12. An actuation system 13 (shown in FIG. 7 but omitted in the remaining drawings) moves the flap 12 between a retracted position (not shown) to an extended position (not shown) via an intermediate position shown in FIGS. 7, 8 and 11.

Figure 7:
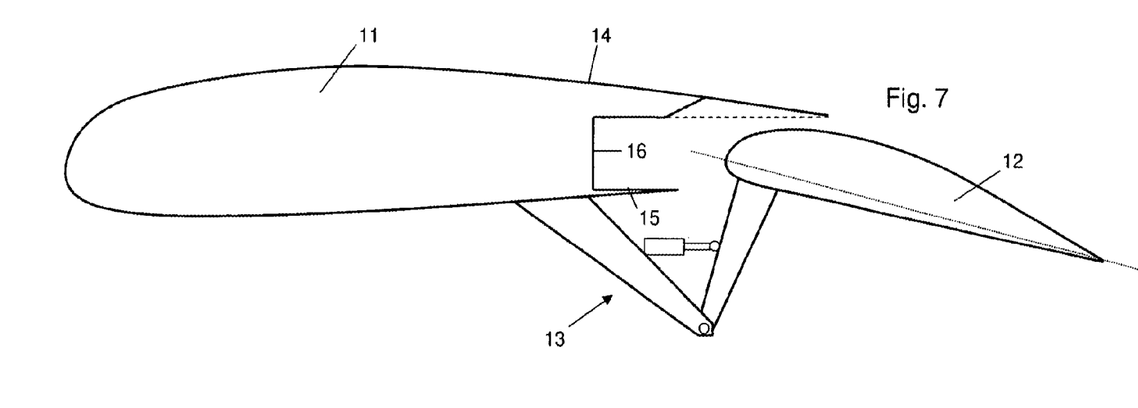
FIGS. 7 and 8 are side views of a wing according to a first embodiment of the present invention.

Note that in the example of FIG. 7 the actuation system 13 comprises a drop hinge driven by a hydraulic actuator so as to rotate the flap about a single pivot point. However various other typed of actuation system can be employed, including (but not limited to) flap track mechanisms or multi-bar linkage systems.

The main wing element 11 has a top skin 14, a bottom skin 15 and a rear spar 16. When the flap 12 is in its full retracted state, it engages the top and bottom skins 14,15 in a similar manner to the conventional flap 3a shown in FIG. 4.

The top skin 14 has a relatively thick region 17 which tapers slightly to the rear (by an angle θ of the order of 2-10°), a relatively thin panel 18 which has substantially uniform thickness, and a highly tapered ramp 19 where the thickness of the skin reduces. Note that the planar ramp 19 may be replaced by an S-shaped, curved, or blended ramp 19a(shown in dashed line) if required. A set of elongate stiffening ridges 20, shown most clearly in FIGS. 9-11, extend from the lower surface of the panel 18.

Each adjacent pair of stiffening ridges 20 defines a channel 21 which is closed at its front end by the ramp 19 and open at its rear end. As shown most clearly in FIGS. 8 and 11, each stiffening ridge 20 tapers by an angle θ to a point at its rear end and the panel 18 extends to either side of the outermost pair of ridges.

The ridges and channels 20,21 extend along the full length of the panel 18, so that their rear ends are positioned substantially at the trailing edge 22 of the panel 18. In the example shown, the upper and lower surfaces of the panel 18 are parallel along the length of the panel including its trailing edge. However the panel may taper slightly towards the rear so that tangents to its upper and lower surfaces transverse to its trailing edge 22 make an angle of less than 5 degrees (and preferably less than 2 degrees) with each other.

Figure 10:
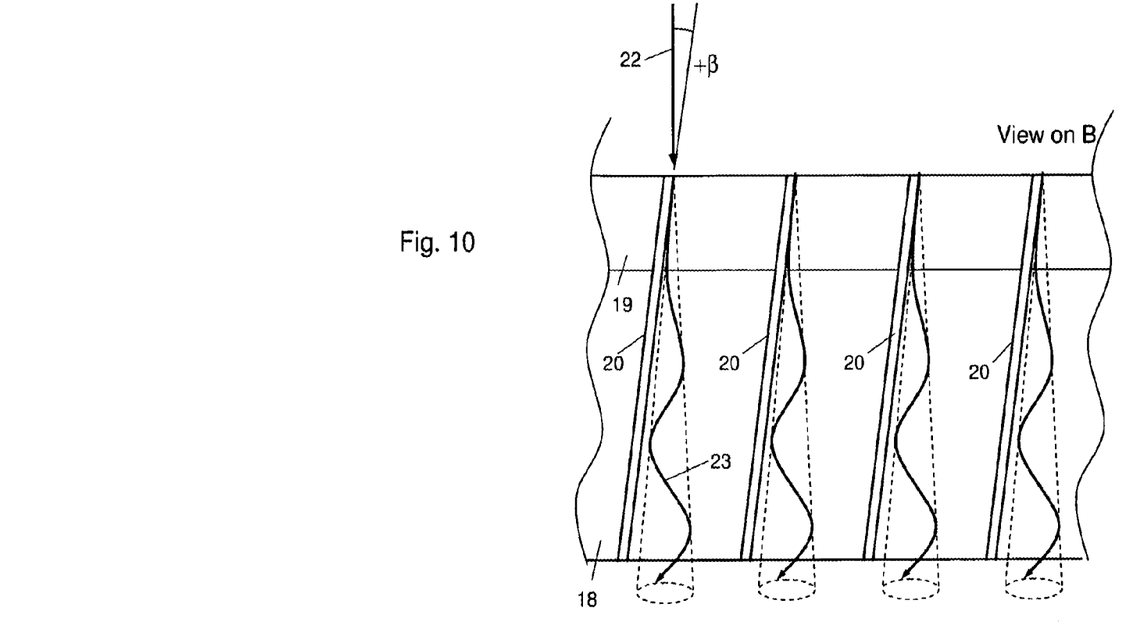
FIG. 10 is a view on B of the underside of the top skin section.
Figure 11:
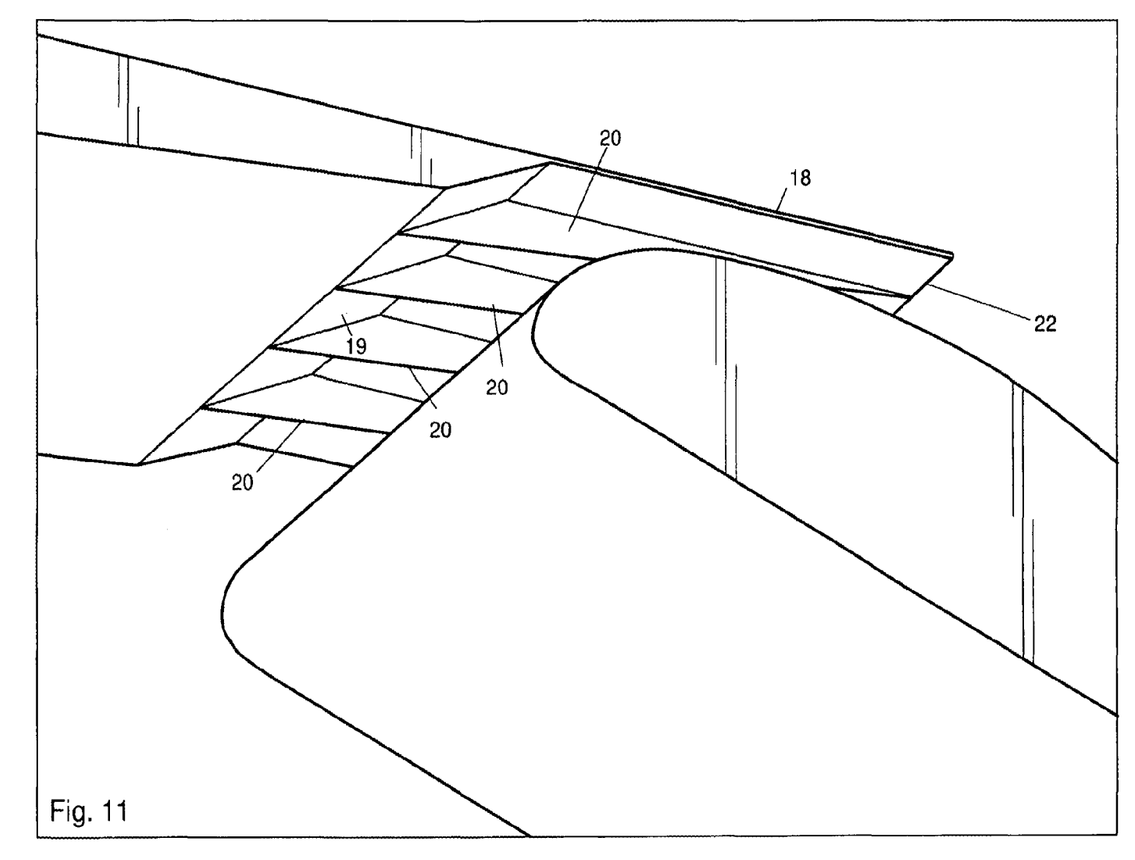
FIG. 11 is an isometric view of the slot.

As shown in FIG. 10 each ridge 20 extends at an angle to a direction of flow 22 of air through the gap. This causes vortices 23 to be generated by the ridges 20. In this case each ridge 20 is oriented at an angle with the same positive sign +β, but equivalently the ridges may be oriented at an angle with a negative sign. In a further alternative the ridges may be arranged in a "herring-bone" configuration where adjacent pairs of ridges extend at opposite angles to each other.

Figure 8:
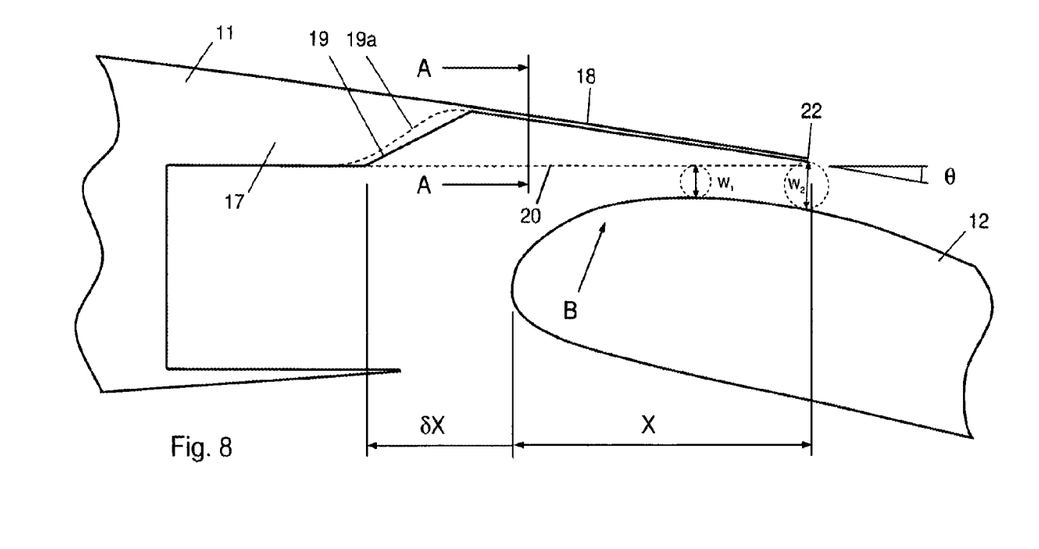

In the intermediate position of FIG. 8, there is a high degree of overlap X between the flap 12 and the top skin, and a distance δX between the leading edge of the flap 12 and the start of the ramp 19.

If we consider the width of the air gap to be defined by the gap between the flap 12 and the lower surface of the panel 18, then the actuation system is configured to orient the flap 12 so that in the intermediate position the width $W_2$ of the air gap at its outlet is at a minimum. In other words, there is no divergence of the air gap in this intermediate position. This compares favourably with the gap which would result if the skin was to follow the profile of the ridges 20. In this case the width $W_2$ of the air gap at its outlet would be greater than the minimum width $W_3$ of the air gap, and hence the air gap would be highly divergent.

In the intermediate position of FIG. 8, the width of the air gap is constant or convergent, and the shaping modification of the panel 18 enables the gap to be constant or convergent in all positions of the flap. However it will be understood that depending on the nature of the actuation system 13 and the shape of the flap 12, the gap may still be divergent in some positions.

Figure 9:
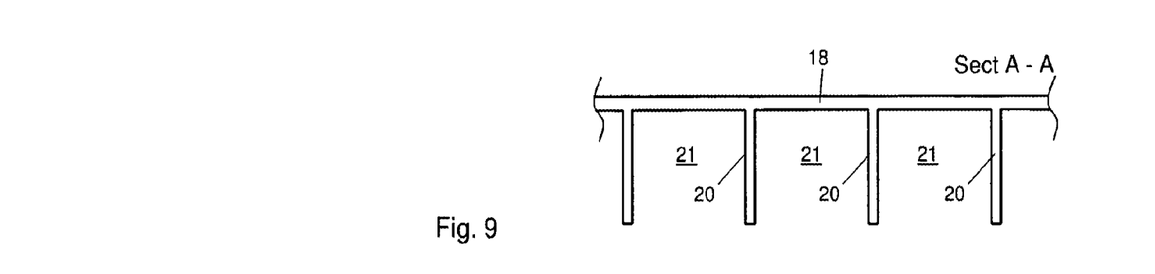
FIG. 9 is a sectional view taken along a line A-A in FIG. 8.

As shown most clearly in FIG. 9, the width of the ridges 20 is substantially less than the width of the channels 21. In the example of FIG. 9 the ratio between the width of each ridge 20 and the width of each channel is of the order of 1:13 (7.7%). As a result the dominant feature (in terms of defining the width of the air gap) is the base of the channels 21—in other words the lower surface of the panel 18 and not the tips of the ridges 20.

The ridges 20 are shown as being rectangular with sides that are parallel along the full length of the ridges. In this case the volumes of the ridges and channels are directly proportional to their respective widths. In alternative embodiments the ridges may have non-parallel sides (and hence for example the width of each ridge may be greater at its base than at its tip). Thus in the more general case the volume of each ridge is typically less than 50% of the volume of a channel defined by that ridge, preferably less than the 25% and most preferably less than 15%.

Preferably the ridges 20 are shaped with relatively sharp edges to generate the vortices 23 shown in FIG. 10 without requiring additional vortex generators between the ridges as in EP 1527992 A2. Note that the relatively small width of the ridges 20 relative to the channels 21 gives sufficient space for these vortices to develop and move along the channels 20.

Also the thickness of the panel 18 as shown in FIGS. 8 and 9 is significantly less than the depth of each channel 20 and ridge 21 at most points, apart from at the trailing edge 22 of the panel. In the example of FIG. 9 (which is a cross-section taken along a line A-A near the foot of the ramp 19) the ratio between these dimensions is of the order of 3:23 (13%). As the ridges 20 taper towards the rear of the panel, this ratio will increase to 100%. In order to maximise the benefit of thinning the top skin, the thickness of the panel at one or more points may be less than the depth of a channel at the same point, typically less than 50%, preferably less than 25% and most preferably less than 15%.

In contrast with the arrangement in US 2006/0202089 A1, the thin panel 18 is stiff and remains fixed in substantially the same position during movement of the flap from its retracted position to its extended position.

Figure 15:
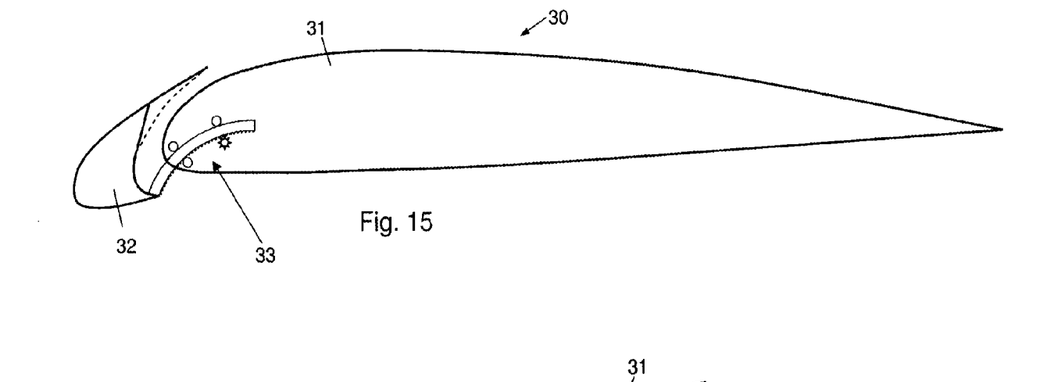
FIGS. 15 and 16 are side views of a wing according to a second embodiment of the present invention.
Figure 16:
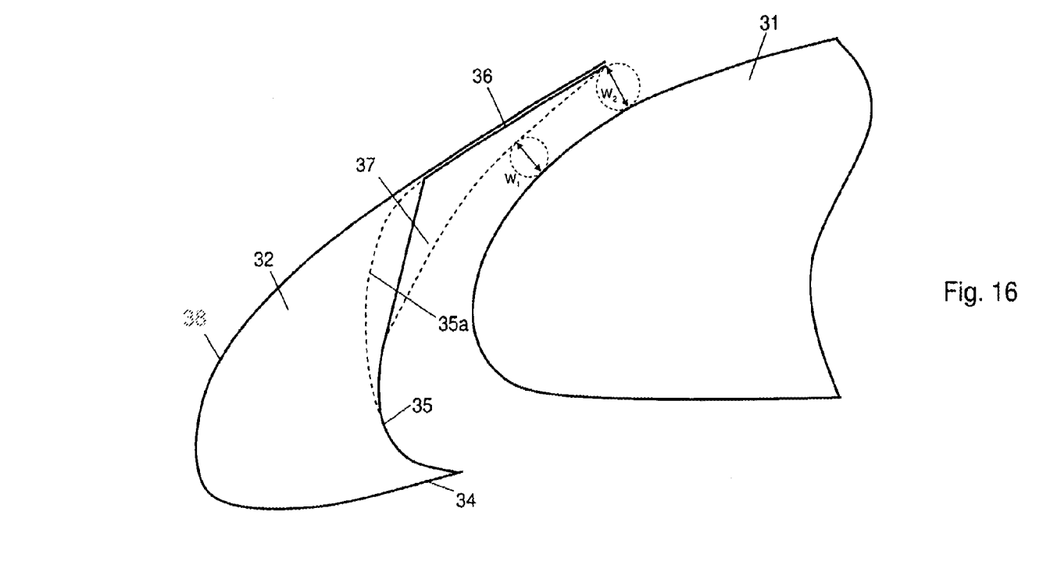

An aircraft wing 30 shown in FIGS. 15 and 16 comprises a main wing element 31 and a slat 32. An actuation system 33 (shown in FIG. 15 but omitted in FIG. 16) moves the slat 32 between a retracted position (not shown) to an extended position (not shown) via an intermediate position shown in FIGS. 15 and 16.

Note that in the example of FIG. 15 the slat actuation system 33 comprises a slat track driven by a set of rollers. However various other types of actuation system can be employed, including (but not limited to) drop-hinge or multi-bar linkage systems.

The slat 32 has a top skin 38, a bottom skin 34 and a cove panel 35 which mates with the fixed leading edge of the main wing element 31 when the slat is retracted.

The top skin 38 has a relatively thin panel 36 which has substantially uniform thickness. A set of tapered elongate stiffening ridges 37 extend from the lower surface of the panel 36 and from the upper region of the cove panel 35. The ridges 37 are shown in side elevation only, but they are similar in form and function to the ridges 20 on the flap 12.

The cove panel 35 is shown with a planar ramp region where it meets the panel 36, but alternatively the cove panel may be curved as indicated in dashed lines 35a.

If we consider the width of the air gap to be defined by the gap between the main wing element 31 and the lower surface of the panel 36, then the actuation system 33 is configured to orient the slat 32 so that in the intermediate position the width W2 of the air gap at its outlet is at a minimum. In other words, there is no divergence of the air gap in this intermediate position. This compares favorably with the gap which would result if the slat 32 was to follow the profile of the ridges 37. In this case the width W2 of the air gap at its outlet would be greater than the minimum width W1 of the air gap, and hence the air gap would be highly divergent.

In the intermediate position of FIG. 16, the width of the air gap is constant or convergent, and the shaping modification of the panel 36 enables the gap to be constant or convergent in all positions of the flap. However it will be understood that depending on the nature of the actuation system 33 and the shape of the slat 32, the gap may still be divergent in some positions.

Although the invention has been described above with reference to one or more preferred embodiments, it will be appreciated that various changes or modifications may be made without departing from the scope of the invention as defined in the appended claims.

The invention claimed is:

1. An aircraft wing comprising:
   a main wing element;
   a moveable element, wherein the moveable element comprises at least one of:
      a leading element in front of the main wing element; or
      a trailing element behind the main wing element relative to
   a direction of flight of the aircraft,
   wherein a front element is a forward one of the main wing element and the moveable element in the direction of flight, and a rear element is a rearward one of the main wing element and the moveable element;
   an actuation system configured to move the moveable element between a retracted position and an extended position in which there is an air gap between a lower surface of the front element and the rear element, wherein the air gap has a length in the direction of flight and a width defined by a shortest dimension between the lower surface of the front element and a surface of the rear element adjacent the air gap and overlapped by the lower surface of the front element, at each point along the length of the air gap; and two or more elongate stiffening ridges extending downwards from the lower surface of the front element, wherein the two or more elongate stiffening ridges overlap the rear element while the actuated system is in the retracted position, wherein each adjacent pair of stiffening ridges is separated by a channel, and the volume of at least one of the ridges is less than the 50% of the volume of the channel adjacent the at least one of the ridges, wherein the actuation system is configured to orient the moveable element so that in at least one intermediate position of the actuation system the width of the air gap is constant or convergent along the length of the air gap and the width of the air gap is at a minimum at an outlet of the air gap.

2. The wing of claim 1, wherein the thickness of the front element at a point along the direction of flight less than the depth of a channel at the same point.

3. The wing of claim 1 wherein each channel has an open rear end which is positioned substantially at a trailing edge of the front element.

4. The wing of claim 1 wherein tangents to the lower surface relative to the upper surface of the front element transverse to the trailing edge of the front element make an angle of less than 5 degrees with each other at the trailing edge.

5. The wing of claim 1 wherein tangents to the lower surface relative to the upper surface of the front element transverse to a trailing edge of the front element make an angle of less than 2 degrees with each other at the trailing edge.

6. The wing of claim 1 wherein a volume of at least one of the ridges is less than 25% of a volume of a channel defined by that ridge.

7. The wing of claim 1 wherein the thickness of the front element at one or more points is less than 50% of the depth of a channel at the same point.

8. The wing of claim 1 wherein each of the two or more elongate stiffening ridge tapers towards a rear end of the stiffening ridge.

9. The wing of claim 1 wherein the surface of the front element extends to either side of the outermost pair of the two or more elongate ridges.

10. The wing of claim 1 wherein at least some of the two or more elongate stiffening ridges extend at an angle greater than 0° to a direction of flow of air through the air gap.

11. The wing of claim 1 wherein the actuation system is configured to orient the moveable element so that, at each of all of the intermediate positions of the actuation system, the width of the air gap is either constant or convergent.

12. The wing of claim 1, wherein the font element is the main wing element which is a fixed wing and the rear element is the moveable element which is a moveable flap, and said actuation system is connected to move said flap between the retracted and the extended positions.

13. The wing of claim 1, wherein said front element is the moveable element which is a moveable slat and the rear element is the main wing element which is a fixed wing, and said actuation system is connected to move said moveable slat between the retracted and the extended positions.

14. An aircraft wing comprising:
a main wing element; and
a moveable element, wherein the moveable element comprises at least one of:
a leading element forward of the main wing element relative to a direction of the aircraft; or
a trailing element behind the main wing element relative to
the direction of flight of the aircraft;
wherein a front element is a forward one of the main wing element and the moveable element in the direction of flight, and a rear element is a rearward one of the main wing element and the moveable element;
an actuation system configured to move the moveable element between a retracted position and an extended position in which there is an air gap between a lower surface front element and the rear element, wherein the air gap has a length in the direction of flight and a width defined by a shortest dimension between the lower surface of the front element and a surface of the rear element adjacent the air gap and overlapped by the lower surface, at each point along the length of the air gap; and
two or more elongate stiffening ridges extending downwards from the lower surface of the front element, wherein the two or more elongate stiffening ridges overlap the surface of the rear element while the actuated system is in the retracted position;
wherein each adjacent pair of stiffening ridges is separated by a channel, and wherein the thickness of the front element at a point along the direction of flight is less than the depth of the channel at the same point,
wherein the actuation system is configured to orient the moveable element so that in at least one intermediate position of the actuation system the width of the air gap is constant or convergent along a length of the air gap in the direction of flight, such that the width of the air gap is at least as great as the width of the air gap at the rear outlet.

15. The wing of claim 14, wherein the front element is the main wing element which is a fixed wing and the rear element is the moveable element which is a moveable flap, and said actuation system is connected to move said moveable flap between the retracted and the extended positions.

16. The wing of claim 14, wherein said front element is the moveable element which is a moveable slat and the rear element is the main wing element which is a fixed wing, and said actuation system is connected to move said moveable slat between the retracted and the extended positions.

17. An aircraft wing comprising:
a main wing element;
a moveable element including at least one of:
a leading element ahead of the main wing element relative to a direction of flight of the aircraft; or
a trailing element behind the leading element relative to a direction of flight of the aircraft;
wherein a forward element is the most forward of the main wing element and the moveable element, and a rear element is the most rearward of the main wing element and the moveable element;
an actuation system configured to move the movable element between a retracted position and an extended position in which there is an air gap between a lower surface of the front element and the rear element, wherein the air gap has a length in the direction of flight and a width defined by a shortest dimension between the lower surface of the front element and an upper surface of the rear element adjacent the air gap and overlapped by the lower surface of the front element, at each point along the length of the air gap; and two or more elongate stiffening ridges extending downwards from the lower surface of the front element, wherein the two or more elongate stiffening ridges overlap the rear element while the actuated system is in the retracted position;

wherein each adjacent pair of ridges is separated by a channel, and wherein each channel has an open rear end which is positioned substantially at a trailing edge of the front element, wherein the actuation system is configured to orient the moveable element so that, at least one intermediate position of the actuation system the width of the air gap is constant or convergent along the length of the air gap in the direction of flight, and such that the width of the air gap at each point forward of a rear outlet is at least as great as the width of the air gap at the rear outlet.

18. The wing of claim 17, wherein the front element is the main wing element which is a fixed wing and the rear element is the movable element which is a moveable flap, and said actuation system is connected to move said moveable flap between the retracted and the extended positions.

19. The wing of claim 17, wherein said front element is the moveable element which is a moveable slat and the rear element is the main wing element which is a fixed wing, and said actuation system is connected to move said moveable slat between the retracted and the extended positions.

20. An aircraft wing comprising:

a main wing;

a flap behind the main wing relative to a flight direction of the aircraft, wherein the flap moves between a retracted position and an extended position with respect to the main wing and the main wing overlaps a portion of an upper surface of the flap at least at the retracted position;

a pair of elongate stiffening ridges each extending down from a section of the lower surface of the main wing towards the overlapped portion of the upper surface of the flap, wherein the stiffening ridges along their entire lengths overlap the overlapped portion of the upper surface of the flap while the flap is in the retracted position;

a channel defined between the pair of elongate stiffening ridges, wherein the channel includes an open trailing end and a closed leading end, and an air gap between the lower surface of the main wing and the overlapped portion of the upper surface of the flap, wherein the air gap has a length in a direction of flight of the aircraft and a width defined by a shortest dimension between the lower surface of the main wing and the overlapped portion of the upper surface of the flap, at each point along the length of the air gap, and wherein the air gap, at an intermediate position of the flap between the retracted and the extended positions, is constant or convergent along a length of the air gap in the direction of flight, and wherein the width of the air gap, at the intermediate position of the flap, is narrowest at a trailing edge of the main wing.

21. An aircraft wing comprising:

a main wing;

a leading edge slat forward of the main wing relative to a flight direction of the aircraft, wherein the leading edge slat moves between a retracted position and an extended position with respect to the main wing, and the leading edge slat overlaps a portion of an upper surface of the main wing while the slat is in the retracted position, a pair of elongate stiffening ridges each extending down from the leading edge slat towards the overlapped portion of the upper surface of the main wing, wherein the stiffening ridges along their entire lengths overlap the overlapped portion of the upper surface of the main wing while the slat is in the retracted position;

a channel defined between the pair of elongate stiffening ridges, wherein the channel includes an open trailing end and a closed leading end;

an air gap between the upper surface of the main wing and the leading edge slat, wherein the air gap has a length in a direction of flight of the aircraft and a width defined by a shortest dimension between the upper surface of the main wing and a portion of the leading edge slat adjacent the air gap and overlapping the upper surface of the main wing, at each point along the length of the air gap, and wherein the air gap, at an intermediate position of the slat between the retracted and the extended positions, is constant or convergent along the length of the air gap in the direction of flight, and wherein the width of the air gap, at the intermediate position, is narrowest at a trailing edge of the slat.

* * * * *